United States Patent Office 3,018,275
Patented Jan. 23, 1962

3,018,275
HALOGENATION OF LOW UNSATURATION RUBBERY POLYMERS IN THE PRESENCE OF OXIDIZING AGENT
Delmer L. Cottle, Highland Park, N.J., assignor to Esso Research and Engineering Company, a corporation of Delaware
No Drawing. Filed Dec. 30, 1958, Ser. No. 783,655
5 Claims. (Cl. 260—85.3)

The present invention relates to a process for making modified polymers. More particularly, it concerns a method of reacting low unsaturation rubbery polymers with halogenating agents in the presence of oxidizing agents which serve to increase the utilization of said halogenating agent in the reaction, as well as the modified rubbery polymers obtained by this method.

In the typical halogenation reaction involving low unsaturation rubbery polymers, e.g. butyl rubber, and halogenating compounds, e.g. bromine, no more than half of the halogen in the reactant combines with the rubbery polymers while the other portion, e.g. hydrogen halide, does not react.

It has now been discovered that the halide in a hydrogen halide can be utilized to introduce halogen into the aforementioned rubbery polymers by carrying out the halogenation in the presence of an oxidizing agent. Since butyl rubber is the principal low unsaturation rubbery polymer employed in the rubber field, the present invention has special application to it. Butyl rubber, a term well known in the rubber art, e.g. Chapter 24 in "Synthetic Rubber" edited by G. Whitby, is a rubbery copolymer comprising a major proportion of an isoolefin having 4 to 7 carbon atoms and a minor proportion of a multiolefin having 4 to 8 carbon atoms. The most commonly employed isoolefin is isobutylene, although other isoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 90–99.5 wt. percent isoolefin and 0.5–10 wt. percent diolefin, which in most instances is isoprene. The polymerization is generally carried out at a low temperature, e.g. between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have viscosity average molecular weights between about 200,000 and 1,500,000 or more and Wijs iodine numbers between about 1 and 50.

According to the present invention a major proportion of low unsaturation rubbery polymer is contacted and admixed with a minor but sufficient amount of halogenating compound in the presence of an oxidizing agent to introduce at least 0.5 weight percent of combined halogen into the polymer but not more than about 3 atoms of combined halogen per double bond in the polymer. The modified polymers prepared in accordance with the present invention may be easily cured with vulcanizing agents which have little or no effect on hydrocarbon rubbers, such as butyl rubber itself.

In carrying out a preferred embodiment of the present invention low unsaturation rubbery polymer is dissolved in a suitable organic solvent, such as a $C_4$ to $C_{10}$ aliphatic, cycloaliphatic or aromatic liquid before it is reacted with the halogenating agent and the oxidizing agent. Suitable solvents include normal hexane, normal pentane, normal heptane, alkanes in general and benzene. Halogen-containing solvents such as chlorobenzene, carbontetrachloride and chloroform may also be used. The polymer solution, which may contain from as little as 1 wt. percent polymer or as much as 30 or 40 wt. percent polymer, is introduced into a reaction zone, provided with suitable means to permit intimate contact with the reactants. The temperature of the polymer solution is adjusted to that which is most convenient for carrying out the reaction in view of the various properties of the reactants and the volatility of the solvent. To insure fairly rapid reaction it is advisable to employ a reaction temperature above 0° C., e.g. at least 5° C., and it is preferred to maintain the temperature between about 20 and 80° C. However under certain conditions, especially where less highly reactive materials are employed, it may be desirable to run the reaction at temperatures ranging up to 150° C. or higher. Generally the oxidizing agent is introduced into the reaction zone before the halogenating compound, however this is not necessary and in some instances it may be advantageous to add a portion or all of the oxidizing agent either simultaneously with or after the halogenating agent has been brought into contact with the polymer. For instance, the halogen content may be controlled by incrementally introducing the oxidizing agent into the reaction zone. The polymer modification reaction which occurs when the reactants are admixed in the proper manner may occur rapidly, e.g. within 30 seconds, or it may require several hours, e.g. 3 to 4 hours, to complete the reaction. In most cases the reaction will be complete within about 1 to 120 minutes after initiation. While atmospheric pressure is satisfactory in many of these reactions, it may be desirable to use up to 100 atmospheres pressure when more volatile materials are present in the reaction mixture. Likewise it may be of some advantage to use sub-atmospheric pressure at times, e.g. 0.1 atmosphere. Upon completion of the reaction, the modified rubber polymer may be isolated from the other components by any technique known in the art. For example, it may be precipitated with an antisolvent such as acetone, redissolved in a solvent, such as those already described, and reprecipitated; the foregoing procedure being repeated until the desired purity is obtained. Other methods such as extraction and distillation may also be employed.

The term halogenating compound as used herein means compounds containing halogen atoms. It includes compounds such as bromine, chlorine bromine, hydrogen bromide (including hydrobromic acid), etc. as well as mixtures thereof. Aqueous solutions of hydrogen halides, especially hydrobromic acid and any system that will generate hydrobromic acid, are preferred. Hydrobromic acid solutions of 10 to 60 wt. percent are quite suitable for carrying out the present invention. The amount of halogenating compound used to modify the rubbery polymer will to a large extent depend upon the halogen itself and the unsaturation of the polymer. Generally the reaction is carried out so that little or no polymer degradation occurs. For most modification reactions the amount of halogenating compound will vary from about 0.5 to 15 phr. (parts by weight per 100 parts rubber) and with reactants such as bromine it is preferred to use no more than about 6 phr.

The amount of oxidizing agent employed in the reaction depends to a large degree on the amount and kind of halogenating compound used. Morever it may be desirable to use only very small amounts of oxidizing agent to cause a small but significant increase in the halogen utilization. Thus a little as 0.1 equivalent or as much as 5 equivalents of oxidizing agent per mol of halogenating compound may be introduced into the reaction zone. When hydrobromic acid is used, 0.5 to 5 equivalents of oxidizing agent per mol of hydrobromic acid are preferred. To insure complete utilization of the halogen within the limits of the reaction condition it is preferred to use an excess of oxidizing agent. For instance, in the case of hydrobromic acid it is advantageous to use 0.5 to 1 mol of hydrogen peroxide per mol of acid. While the oxidizing agent may be introduced into the reaction zone in any suitable diluent or solvent including carbon tetrachloride or nitrogen, it has been found that an aqueous solution of the oxidizing agent will give satisfactory results where the agent is one which is compatible with water. For example, a 1 to 50 wt. percent solution of the oxidizing agent serves a two-fold purpose, that is to say, it facilitates the introduction of the oxidizing agent to the reaction zone and serves as a source of water which is believed to be beneficial to the reaction. It is necessary to have only a sufficient amount of water present to assist the reaction between the halogen and oxidizing agent to take place. Thus the quantity of water in the reaction zone may range from 0 up to 100 phr., the preferred amount being about 1 to 50 phr.

Among the oxidizing agents which have been found suitable for the purposes of the present invention are the following inorganic substances: hydrogen peroxide, sodium chlorate, sodium bromate, sodium peroxide, sodium hypo-chlorite, oxygen, oxides of nitrogen, etc. Of the foregoing, hydrogen peroxide and hydrogen peroxide-forming compounds e.g. sodium peroxide, have been found to be highly suitable for carrying out the present reaction.

The modified rubbery polymer prepared in accordance with the above described methods have physical properties which are analogous to those possessed by butyl rubber. That is to say that they have a viscosity average molecular weight of about 100,000 to 1,500,000 or more and may be vulcanized to produce a useful rubbery substance. They have the added advantage of containing a number of highly reactive halogen atoms which make them highly reactive and easily curable. The modified rubbery polymers may contain as much as 3.5 wt. percent combined halogen or more. They may be admixed with conventional compounding agents according to known techniques to produce highly useful rubber articles. The following recipe indicates the kind and amounts of ingredients that may be compounded with the modified rubbery polymers.

| Ingredients: | Parts by weight |
| --- | --- |
| Modified rubbery polymer | 100 |
| Other polymers (SBR, natural rubber, butyl rubber, etc.) | 1–100 |
| Fillers (black and non-black) | 25–75 |
| Stearic acid | 1–10 |
| Metal oxide (zinc oxide) | 0.5–20 |
| Pigment (titanium dioxide) | 1–20 |
| Extender oil (hydrocarbon oil) | 1–30 |
| Plasticizer | 1–75 |
| Curing agents (sulfur, quinoid type compounds, etc.) | 1–20 |
| Accelerators (benzothiazyldisulfide) | 0.5–10 |
| Scorch retarders | 0.5–10 |
| Antioxidant (phenyl-β-naphthylamine) | 0.1–5 |

It should be noted that any one or more of the ingredients in the above table may be eliminated from the recipe according to the desires of the formulator.

Among the carbon blacks that may be compounded with the rubber are the channel blacks such as EPC, MPC, HPC, and CC (these letters denoting carbon black products well known to the trade), the furnace blacks including SRF, HMF, CF, FF and HAF carbon blacks and the thermal blacks.

The mineral fillers which may be used include any of the non-carbon black fillers or pigments such as the oxides, hydroxides, carbonates and so forth of silicon, aluminum, magnesium, titanium, or the like, or silicates or aluminates of the various elements indicated.

In addition to sulfur-donning compounds and quinoid type compounds (e.g. paraquinone dioxime), any of the known curing agents for halogenated butyl rubber may be employed, for instance dimethylol para-hydrocarbon substituted phenol resins. The aforementioned curing agents may be used with or without any of the common rubber accelerators such as tetramethylthiuram disulfide, tellurium diethyl dithiocarbamate, diphenyl guanidine, etc.

The compounded modified rubbery polymers of the present invention may be vulcanized by heating the compounded polymer in the presence of a suitable curing agent to a temperature between 120 and 230° C. and from a few minutes to 40 or 60 minutes. The vulcanized modified rubbery polymer is useful in rubber articles such as tires, curing bags, rubber belts, hoses and the like.

The following examples are presented to give a clear understanding of how the process of the present invention may be carried out as well as the benefits obtained from its use.

*Example 1*

Isobutylene-isoprene butyl rubber having an iodine number of 10.6 (drastic mercuric acetate method), a mol percent unsaturation of 1.56 and a viscosity average molecular weight of 465,000 was dissolved in normal hexane, which had been previously treated with aluminum chloride, to make a 15 wt. percent cement. The cement, which contained 100 grams of rubber, was introduced into a reaction vessel equipped with an efficient agitator and was vigorously stirred while 8 ml. of 30 wt. percent hydrogen peroxide was added to it. Immediately thereafter 7.9 ml. of 48 wt. percent hydrobromic was added at one time. The reaction mixture was stirred vigorously for 1.5 hours at room temperature (25° C.). At the end of this time the rubber was isolated by precipitating the rubber with acetone, filtering the precipitate, dissolving the precipitate in normal hexane and reprecipitating with acetone. The residual solvents were stripped from the rubber by heating it for 16 hours at 60° C. under 180 to 240 mm. of mercury pressure. The modified rubber was then analyzed and it was found that the rubber contained 2.22 wt. percent bromine. Thus the butyl rubber was brominated to 100% of the theoretical amount of the bromine (2.17 wt. percent) that could be introduced into the rubber. The bromine utilization was 40%.

*Example 2*

Example 1 was repeated except that 4.35 ml. of 48 wt. percent hydrobromic acid and 4.75 ml. of 30 wt. percent hydrogen peroxide were used. The modified rubber recovered contained 1.80 wt. percent combined bromine which is 83 wt. percent of the theoretical amount of bromine that could be introduced into the rubber. The bromine utilization was 60%.

*Example 3*

250 g. of the same butyl rubber used in Example 1 was dissolved in 2500 cc. of a $C_6$ cut, and treated with 31.5 g. of 40 wt. percent hydrobromic acid and 88 g. of 3% hydrogen peroxide over a 3 hours period as described in the aforementioned example. The polymer contained 2.11 wt. percent bromine, which is 97% of the theoretical amount of bromine that could be introduced into the rubber. The bromine utilization was 42%.

It is of course, understood that the above examples are submitted merely to illustrate the invention and there is no intention to limit the invention to them. Resort may be had to various modifications and variations of the present invention without departing from the spirit of the discovery or the scope of the appended claims.

What is claimed is:

1. A process for modifying low unsaturation rubbery copolymer of a major portion of a $C_4$ to $C_7$ isoolefin and a minor portion of a $C_4$ to $C_8$ multiolefin which comprises contacting a solution of said copolymer with hydrogen halide in the presence of a solution of hydrogen peroxide at a temperature of 20 to 80° C. until said copolymer contains at least 0.5 wt. percent combined halogen but not more than 3 atoms of combined halogen per double bond in said copolymer.

2. A process for modifying low unsaturation rubbery copolymer of a major portion of a $C_4$ to $C_7$ isoolefin and a minor portion of a $C_4$ to $C_8$ multiolefin which comprises contacting a major proportion of said copolymer with a minor amount of hydrogen halide in the presence of a solution of hydrogen peroxide at a temperature of 20 to 80° C. for from a few seconds to several hours so as to produce a halogenated copolymer containing at least 0.5 wt. percent combined halogen but not more than 3 atoms of combined halogen per double bond in said copolymer.

3. A process for modifying butyl rubber, said rubber being a copolymer of a major portion of a $C_4$ to $C_7$ iso-olefin and a minor portion of a $C_4$ to $C_8$ multiolefin, which comprises dissolving 100 parts by weight of said butyl rubber in an inert organic solvent, adding about 1 to 6 parts by weight of hydrogen bromide to the dissolved butyl rubber in the presence of a solution of hydrogen peroxide, maintaining the temperature of the mixture at about 20 to 80° C. until the rubber contains up to 3 atoms of combined bromine, said hydrogen peroxide being present in an amount of 1 to 5 equivalents per mol of hydrogen halide.

4. A process for modifying isobutylene-diolefin butyl rubber copolymer of a major portion of isobutylene and a minor portion of a $C_4$ to $C_8$ diolefin which comprises dissolving 100 parts by weight of said butyl rubber in an inert organic solvent, adding from about 1 to 6 parts by weight of hydrobromic acid to the dissolved rubber in the presence of a minor amount of hydrogen peroxide aqueous solution, said peroxide being present in an amount of 1 to 5 equivalents per mol of hydrobromic acid, maintaining the temperature of the mixture between 20 to 80° C. for from 1 to 120 minutes, separating the inert organic solvent from said butyl rubber, and recovering a modified butyl rubber containing at least 0.5 wt. percent combined halogen but not more than 3 atoms of bromine per double bond in said rubber.

5. A process according to claim 4 in which the hydrobromic acid is added as a 10 to 60 wt. percent solution.

References Cited in the file of this patent

UNITED STATES PATENTS

| | | |
|---|---|---|
| 2,181,158 | Sparks et al. | Nov. 28, 1939 |
| 2,809,372 | Frederick et al. | Oct. 8, 1957 |
| 2,913,449 | Hoerger et al. | Nov. 17, 1959 |

OTHER REFERENCES

"Synthetic Rubber," by Whitby, John Wiley and Sons, 1954, pages 623 and 624.

"Unit Processes in Organic Synthesis," by Groggins, fifth edition, McGraw-Hill Book Co., 1958, pages 245–247.